United States Patent
Horvath et al.

(10) Patent No.: US 8,793,477 B2
(45) Date of Patent: Jul. 29, 2014

(54) BOOTSTRAP OS PROTECTION AND RECOVERY

(75) Inventors: Akos Horvath, Kitchener (CA);
Alessandro Faieta, Kitchener (CA)

(73) Assignee: McAfee, Inc., Santa Clara, CA (US)

( * ) Notice: Subject to any disclaimer, the term of this patent is extended or adjusted under 35 U.S.C. 154(b) by 1427 days.

(21) Appl. No.: 12/068,834

(22) Filed: Feb. 12, 2008

(65) Prior Publication Data
US 2009/0205045 A1 Aug. 13, 2009

(51) Int. Cl.
*G06F 9/00* (2006.01)
*G06F 11/00* (2006.01)

(52) U.S. Cl.
USPC .................. 713/2; 726/22; 726/23

(58) Field of Classification Search
USPC .............. 726/22–25; 713/2; 717/171–173
See application file for complete search history.

(56) References Cited

U.S. PATENT DOCUMENTS

| | | | | |
|---|---|---|---|---|
| 5,511,184 | A * | 4/1996 | Lin | 710/261 |
| 5,790,431 | A * | 8/1998 | Ahrens et al. | 718/104 |
| 5,978,912 | A * | 11/1999 | Rakavy et al. | 713/2 |
| 5,987,610 | A | 11/1999 | Franczek et al. | |
| 6,073,142 | A | 6/2000 | Geiger et al. | |
| 6,460,050 | B1 | 10/2002 | Pace et al. | |
| 6,625,754 | B1 * | 9/2003 | Aguilar et al. | 714/15 |
| 7,506,155 | B1 | 3/2009 | Stewart et al. | |
| 7,665,081 | B1 * | 2/2010 | Pavlyushchik | 717/168 |
| 2002/0078142 | A1 * | 6/2002 | Moore et al. | 709/203 |
| 2004/0236960 | A1 * | 11/2004 | Zimmer et al. | 713/200 |
| 2005/0257205 | A1 * | 11/2005 | Costea et al. | 717/168 |
| 2006/0080522 | A1 * | 4/2006 | Button et al. | 713/2 |
| 2006/0185015 | A1 * | 8/2006 | Cheston et al. | 726/24 |
| 2007/0130624 | A1 * | 6/2007 | Shah et al. | 726/24 |
| 2007/0174732 | A1 * | 7/2007 | Irby et al. | 714/47 |

OTHER PUBLICATIONS

"Trinity Rescue Kit 1.1: Usage Howto," http://trinityhome.org/trk1. 1/usage.shtml, retrieved from web.archive.org, archived Jun. 26, 2007.*

* cited by examiner

*Primary Examiner* — Darren B Schwartz
(74) *Attorney, Agent, or Firm* — Patent Capital Group

(57) ABSTRACT

A method, system, and computer program product for protecting a computer system provides bootstrap operating system detection and recovery and provides the capability to detect malware, such as rootkits, before the operating system has been loaded and provides the capability to patch malfunctions that block the ability of the computer system to access the Internet. A method for protecting a computer system includes reading stored status information indicating whether network connectivity was available the last time an operating system of the computer system was operational, when the stored status information indicates that network connectivity was not available, obtaining a software patch, and executing and applying the software patch.

20 Claims, 2 Drawing Sheets

BOOTSTRAP OS PROTECTION AND RECOVERY

BACKGROUND OF THE INVENTION

1. Field of the Invention

The present invention relates to detecting a kernel-mode rootkit that hooks the Windows System Service Dispatch Table.

2. Description of the Related Art

A rootkit is a set of software tools intended to conceal running processes, files or system data, thereby helping an intruder to maintain access to a system whilst avoiding detection. Rootkits are known to exist for a variety of operating systems such as Linux, Solaris and versions of Microsoft Windows. Rootkits often modify parts of the operating system or install themselves as drivers or kernel modules. Rootkits need to hide something, whether it is a process, a thread, a file, or a registry entry, etc. from user mode applications and from kernel mode device drivers. To achieve that, Rootkits have to alter the execution path of the file system, the processes, the threads and the registry functions.

One popular technique used by Rootkits device drivers is to hook the file system, the process, and the registry query functions inside the System Service Dispatch Table (SSDT) by replacing the functions pointers inside the SSDT table with new pointers that point to their own functions. This change of the execution path would affect all Nt/Zw function calls made by user mode applications and all Zw function calls made by kernel mode device drivers.

A number of techniques for detecting rootkits and protecting computer systems from rootkits have arisen. However, as implemented, these techniques only start protecting the computer system after the operating system has been loaded. Rootkits, or other bad software (malware) can run before the detection and protection software is loaded to memory and allowed to execute. This may cause a problem in that the detection and protection software may miss the presence of the rootkit or to be affected or modified by the rootkit.

Another problem arises when detection and protection software malfunctions (such as due to a bug in the software) and blocks the ability of the computer system to access the Internet. Typically, such malfunctions are corrected by downloading an update or patch to the software over the Internet. However, if the malfunction itself prevents the computer system from accessing the Internet, it becomes very difficult for the typical update mechanism to download an update or patch that will resolve the bug causing the failure to access the Internet. Such a bug would also prevent the user of the computer system from manually getting an update website to download a patch to resolve the issue.

A need arises for a technique by which malware detection and protection software can detect malware, such as rootkits, before the operating system has been loaded and which provides the capability to patch malfunctions that block the ability of the computer system to access the Internet.

SUMMARY OF THE INVENTION

A method, system, and computer program product for protecting a computer system provides bootstrap operating system detection and recovery and provides the capability to detect malware, such as rootkits, before the operating system has been loaded and provides the capability to patch malfunctions that block the ability of the computer system to access the Internet.

A method for protecting a computer system comprises the steps of reading stored status information indicating whether network connectivity was available the last time an operating system of the computer system was operational, when the stored status information indicates that network connectivity was not available, obtaining a software patch, and executing and applying the software patch. These steps are performed after only a portion of a boot process has been performed and before the operating system of the computer system is operational. The portion of a boot process that has been performed is the power-on self-test.

The step of obtaining the software patch comprises the steps of loading a stand-alone network driver, using the stand-alone network driver to connect to a device on a network, and downloading the software patch from the device on the network.

The method further comprises the steps of scanning files needed to complete the boot process to determine integrity of the files and if the integrity of the files is intact, completing the boot process. If the integrity of the files is not intact, corrective action is taken. The corrective action comprises halting the boot process, or restoring the files and completing the boot process.

The method further comprises the steps of upon completion of the boot process, determining whether network connectivity is available and storing status information indicating whether network connectivity is available.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
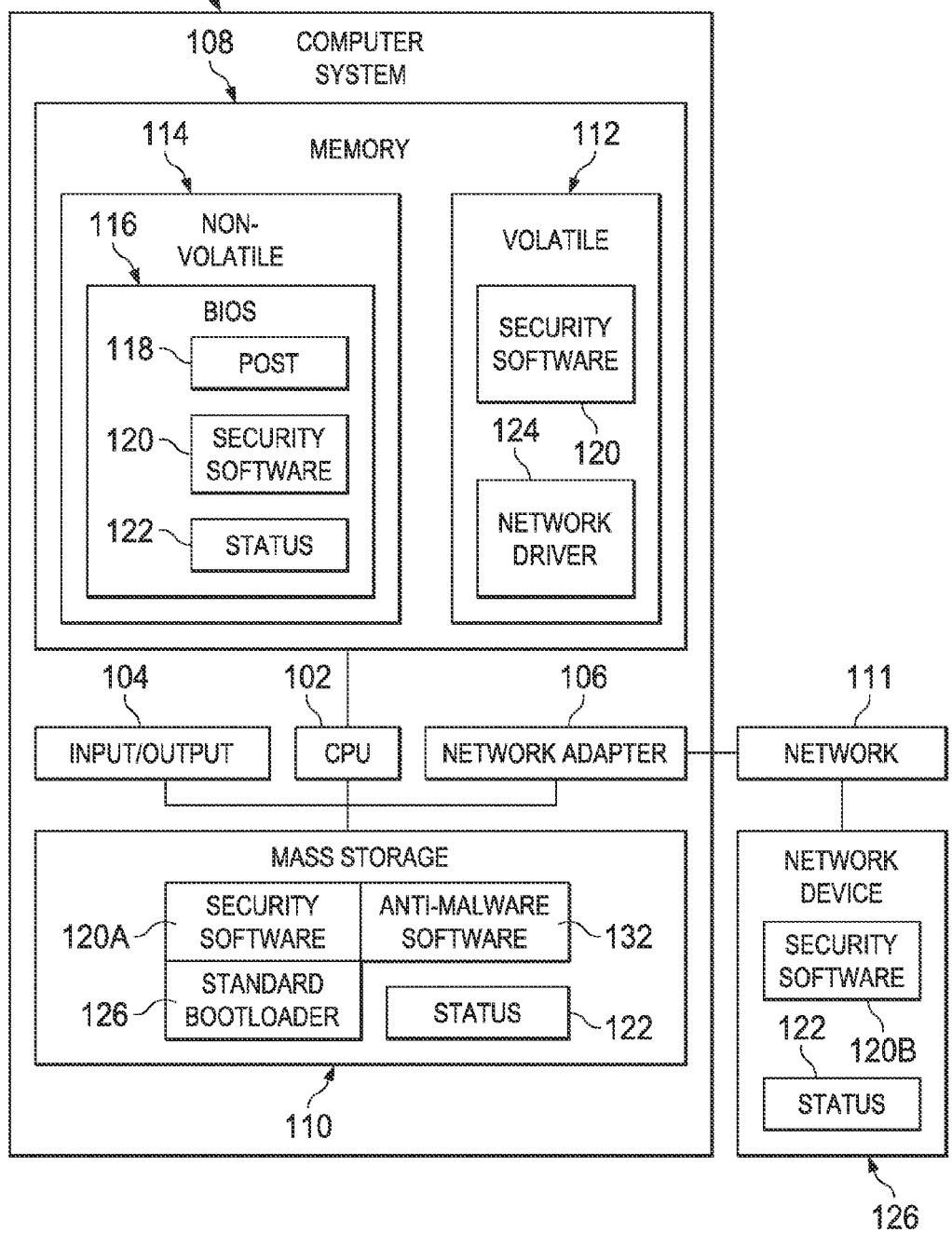
FIG. 1 is an exemplary block diagram of a computer system 100 in which the present invention may be implemented.

An exemplary block diagram of a computer system 100 in which the present invention may be implemented is shown in FIG. 1. Computer system 100 is typically a programmed general-purpose computer system, such as a personal computer, workstation, server system, and minicomputer or mainframe computer. Computer system 100 includes processor (CPU) 102, input/output circuitry 104, network adapter 106, memory 108, and mass storage 110. CPU 102 executes program instructions in order to carry out the functions of the present invention. Typically, CPU 102 is a microprocessor, such as an INTEL PENTIUM® processor, but may also be a minicomputer or mainframe computer processor. Although in the example shown in FIG. 1, computer system 100 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which computer system 100 is implemented on a plurality of networked computer systems, which may be single-processor computer systems, multi-processor computer systems, or a mix thereof.

Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces computer system 100 with network 111. Network 111 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include volatile memory 112, including electronic memory devices such as random-access memory (RAM), and non-volatile memory 114, including electronic memory devices such as read-only memory (ROM), programmable read-only memory (PROM), electrically erasable programmable read-only memory (EEPROM), flash memory, etc. Mass storage 110 provides the capability to store large amounts of information, such as program instructions and data, in a persistent and accessible form. Mass storage 110 typically includes electromechanical storage devices, such as magnetic disk drives, tape drives, optical disk drives, etc., which may use an integrated drive electronics (IDE) interface, or a variation or enhancement thereof, such as enhanced IDE (EIDE) ultra direct memory access (UDMA), or Serial Advanced Technology Attachment (SATA), or a small computer system interface (SCSI) based interface, or a variation or enhancement thereof, such as fast-SCSI, wide-SCSI, fast and wide-SCSI, etc, or a fiber channel-arbitrated loop (FC-AL), etc. Mass storage 110 may also include electronic memory devices, which are typically non-volatile devices, such as those described above, but which also may be volatile memory devices.

In a typical modern computer system, non-volatile memory 114 includes a Basic Input/Output System 116 (BIOS), which includes program code that performs a number of important functions, including booting the computer. Booting, also known as booting up or bootstrapping, is a process that performs the operations required to place a computer into its normal operating configuration after power is supplied to the hardware, or after a reset is performed. Most computer systems can only execute code stored in memory devices, such as ROM or RAM. Modern operating systems are stored on hard disks, or other non-volatile mass storage devices. When a computer is first powered on, it doesn't have an operating system stored in its memory devices. A special program, called a bootstrap loader, bootstrap or boot loader is used to load the software needed for the operating system to start. Often, multiple-stage boot loaders are used, in which several small programs of increasing complexity load each other, until the last of them loads the operating system.

Typically, the first function after power-on that is performed by a BIOS is the Power-On Self-Test 118 (POST). A typical BIOS will perform at least some of the following functions during POST, although not necessarily in the listed order:

verify the functionality of the process (CPU);
verify the integrity of the BIOS code itself;
determine the reason POST is being executed (cold or warm restart, exit from power saving mode, etc.);
find, size, and verify system main memory;
discover, initialize, and catalog all system buses and devices;
pass control to other specialized BIOSes or bootloader programs;
provide a user interface for system's configuration;
identify, organize, and select which devices are available for booting; and
construct whatever system environment that is required by the target OS.

In the present invention, BIOS 116 passes control to a specialized security software, which performs the functions of the present invention. Preferably, control is passed to security software immediately after completion of the POST operations of verifying the functionality of the process (CPU), verifying the integrity of the BIOS code, determining the reason POST is being executed, verifying system main memory, and initializing system buses and devices.

Figure 2:
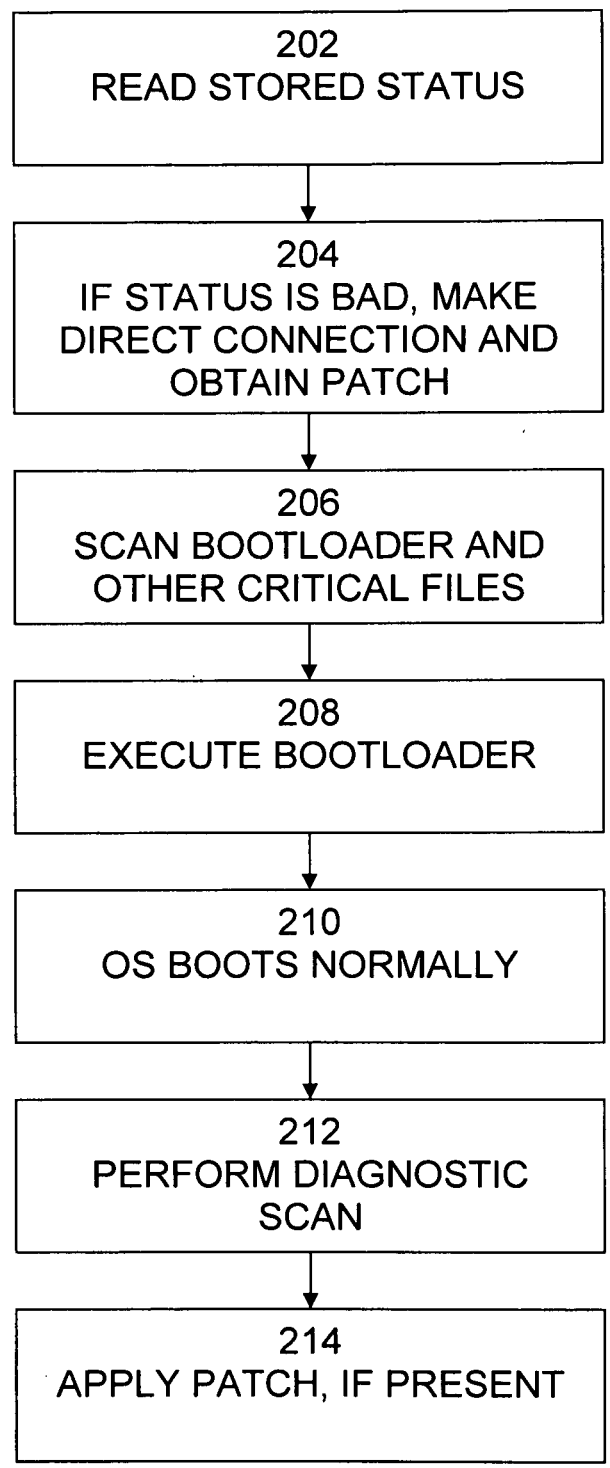
FIG. 2 is an exemplary flow diagram of a process, which is performed by the security software shown in FIG. 1.

An exemplary flow diagram of a process 200, which is performed by the security software, is shown in FIG. 2. It is best viewed in conjunction with FIG. 1. Process 200 begins with step 202, in which a stored status 122 is read. Security software 120 reads status 122 to determine whether network connectivity was correctly functioning the last time the operating system of the computer system was operational. This status 122 is stored in step 212 below and may be stored in one or more of a variety of secure locations, such as in non-volatile memory 114, mass storage 110, or on a network device 126 that is communicatively connected to computer system 100 by network 111. Security software 120 and the location in which status 122 is stored may be checked to determine whether tampering has occurred, for example, by determining a checksum or hash of the memory or files in which security software and/or status 122 are stored. Such a checksum or hash may be stored in non-volatile memory (not shown), as in BIOS 116 or elsewhere, in mass storage 110 (not shown), or on a network device (not shown) on network 111.

In step 204, if the status is bad, this indicates no network connectivity that no network connectivity was available the last time the operating system of the computer system was operational. Typically, network connectivity will not be available due to a bug in software that is loaded during start up of the operating system, such as anti-malware software. When the status is bad, security software 120 loads its own stand-alone (not involving the operating system) network driver software 124 and makes a direct network connection over network 111 to a network device (not shown) from which a software patch may be downloaded. For example, security software 120 may connect to a particular website and download a software patch. Depending upon the nature of the patch, the patch may be executed and applied at this time, or the patch may be executed and applied after the operating system is operational (see step 214).

In step 206, security software 120 performs an integrity and/or malware scan of critical software, such as BIOS 116, critical operating system files, such as the portion of the standard bootloader 126 that is stored in mass storage 110, and anti-malware software 132. If anomalies or malware are detected by this scan, security software 120 takes appropriate corrective action, such as restoring critical files from a secure location on mass storage 110 or from a network device (not shown) on network 111. Alternatively, the boot process can be halted, in which case manual repair is necessary.

In step 208, security software 120 loads the operating system standard bootloader 126 and executes it, allowing the operating system to continue its booting operation from the point at which the POST operation passed control to security software 120.

In step 210, the operating system boots normally. In step 212, anti-malware software 132, which is loaded automatically when the operating system boots normally, performs a diagnostic scan to ensure that network connectivity is available and its update 15 mechanism is functioning. Anti-malware software 132 stores the result of this diagnostic scan as a status 122 that is examined by security software 120 in step 204 the next time the computer is booted. In step 214, if a patch was downloaded in step 204 and the nature of the patch is such that is to be executed once the operating system is operational, that patch is executed in order to update the corresponding software.

In one possible implementation, security software 120A can be stored as a bootloader program itself on mass storage 110, such as a hard disk drive. In this implementation, the first sector of the hard disk drive is altered to load security software 120A upon the POST process passing control to the software in the first sector of the hard drive. As there are other special bootloader programs that may be installed in a computer system, such as special bootloaders that provide a user with a choice of operating system to load, security software 120A should be aware of the other special bootloader programs. In particular, security software 120A should ensure that it runs before any other special bootloader programs run, and that, upon successful completion of security software 120A, control is passed to the correct special bootloader program. While this is easily achieved if security software 120A is installed after any other special bootloader programs, additional steps must be taken if another special bootloader program is installed after security software 120A is installed. In this case, the other special bootloader program may overwrite the first sector of the hard disk drive. Security software 120A or anti-malware software 132 must therefore subsequently detect that the first sector of the hard disk drive has been overwritten and restore the first sector of the hard disk drive so that security software 120A runs properly. This is also useful in the case where the first sector of the hard disk drive has been overwritten or modified due to malware or error.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, comprising:
   reading, upon a completion of at least one power-on self-test operation, stored status information indicating whether a network connectivity was available a last time an operating system of a computer system was operational;
   loading a stand-alone network driver that does not involve the operating system, when the stored status information indicates that the network connectivity was not available;
   when the stored status information indicates that the network connectivity was not available, using the stand-alone network driver to obtain a software patch from a device on a network, wherein the software patch is for software of the computer system; and
   executing and applying the software patch.

2. The method of claim 1, wherein the reading is performed before the operating system of the computer system is operational.

3. The method of claim 2, further comprising:
   scanning files to complete a boot process to determine an integrity of the files, the boot process including the at least one power-on self-test operation; and
   if the integrity of the files is intact, completing the boot process.

4. The method of claim 3, further comprising:
   if the integrity of the files is not intact, taking a corrective action.

5. The method of claim 4, wherein the corrective action comprises halting the boot process, or restoring the files along with completing the boot process.

6. The method of claim 3, further comprising:
   upon a completion of the boot process, determining whether a network connectivity is available; and
   storing status information indicating whether a network connectivity is available.

7. The method of claim 1, further comprising:
   performing a hash to identify whether the software includes an error.

8. The method of claim 7, wherein the software is anti-malware software.

9. A computer system, comprising:
   a processor operable to execute computer program instructions; and
   a memory operable to store the computer program instructions, such that
   the processor is configured to read, upon a completion of at least one power-on self-test operation, stored status information indicating whether a network connectivity was available a last time an operating system of the computer system was operational, to load a stand-alone network driver that does not involve the operating system, when the stored status information indicates that the network connectivity was not available, to use the stand-alone network driver to obtain a software patch from a device on a network, when the stored status information indicates that the network connectivity was not available, and to execute and apply the software patch, wherein the software patch is for software of the computer system.

10. The computer system of claim 9, wherein the processor reads the stored status information before the operating system of the computer system is operational.

11. The computer system of claim 10, wherein the processor is configured to scan files to complete a boot process to determine an integrity of the files, the boot process including the at least one power-on self-test operation, and, if the integrity of the files is intact, to complete the boot process.

12. The computer system of claim 11, further comprising:
    if the integrity of the files is not intact, taking a corrective action.

13. The computer system of claim 12, wherein the corrective action comprises halting the boot process, or restoring the files along with completing the boot process.

14. The computer system of claim 13, further comprising:
    upon a completion of the boot process, determining whether a network connectivity is available; and
    storing status information indicating whether a network connectivity is available.

15. A computer program product that includes a non-transitory computer readable storage medium and computer program instructions for performing operations, the operations comprising:
    reading, upon a completion of at least one power-on self-test operation, stored status information indicating whether a network connectivity was available a last time an operating system of a computer system was operational;

loading a stand-alone network driver that does not involve the operating system, when the stored status information indicates that the network connectivity was not available;

using the stand-alone network driver to obtain a software patch from a device on a network, when the stored status information indicates that the network connectivity was not available, wherein the software patch is for software of the computer system; and executing and applying the software patch.

16. The computer program product of claim 15, wherein the reading is performed before the operating system of the computer system is operational.

17. The computer program product of claim 16, the operations further comprising:

scanning files to complete a boot process to determine an integrity of the files, the boot process including the at least one power-on self-test operation; and if the integrity of the files is intact, completing the boot process.

18. The computer program product of claim 17, the operations further comprising:

if the integrity of the files is not intact, taking a corrective action.

19. The computer program product of claim 18, wherein the corrective action comprises halting the boot process.

20. The computer program product of claim 19, the operations further comprising:

upon a completion of the boot process, determining whether a network connectivity is available; and storing status information indicating whether a network connectivity is available.

\* \* \* \* \*